Aug. 26, 1924.
B. F. GIFT
REFLECTOR
Filed April 3, 1923
1,506,339
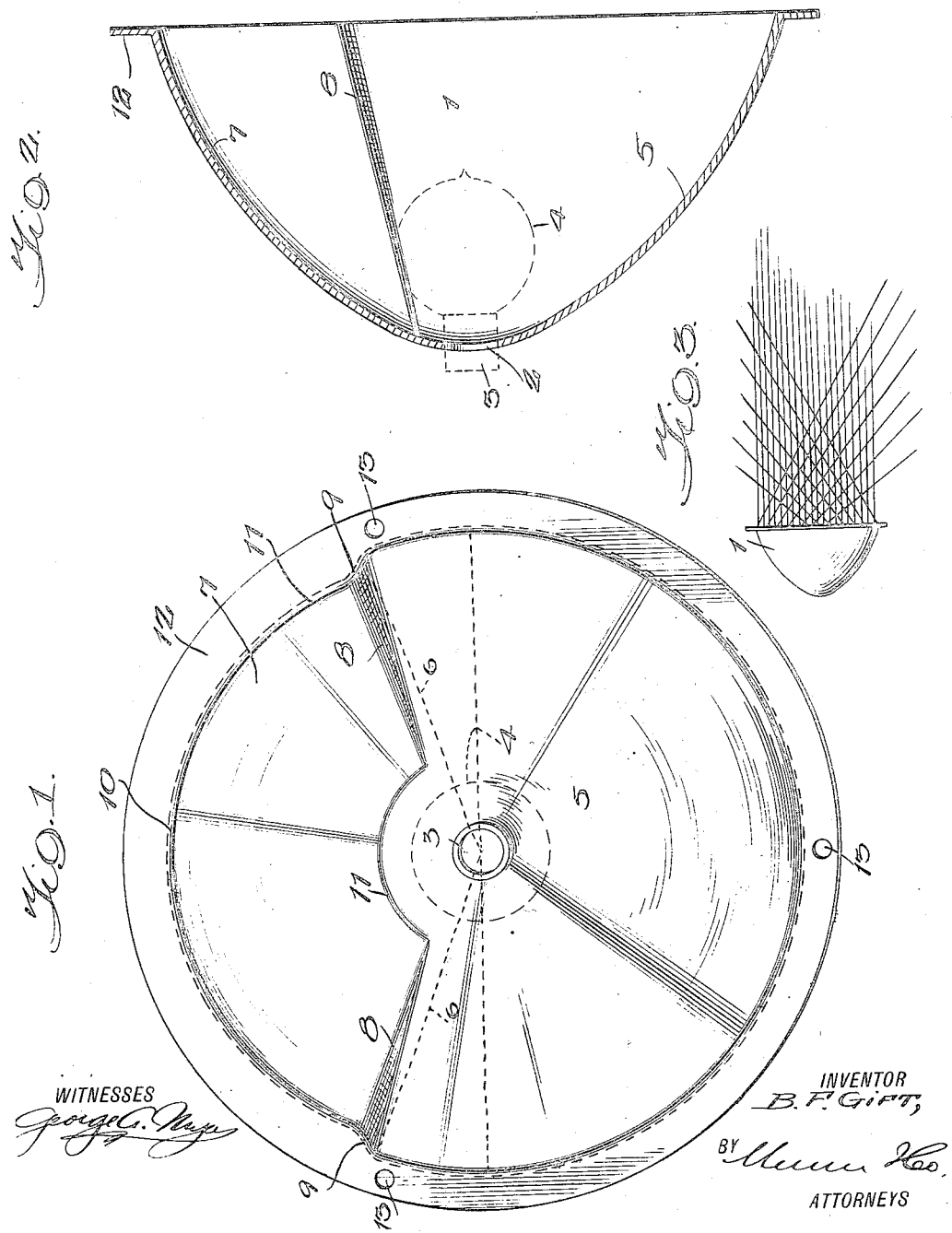

Patented Aug. 26, 1924.

1,506,339

UNITED STATES PATENT OFFICE.

BENJAMIN FRANKLIN GIFT, OF DUNKIRK, INDIANA.

REFLECTOR.

Application filed April 3, 1923. Serial No. 629,688.

*To all whom it may concern:*

Be it known that I, BENJAMIN FRANKLIN GIFT, a citizen of the United States, and a resident of Dunkirk, in the county of Jay and State of Indiana, have invented certain new and useful Improvements in Reflectors, of which the following is a specification.

This invention relates to headlights for automobiles and has for its object the provision of a reflector which will increase the efficiency of the headlight to such an extent that a minimum of glare to an approaching driver and a maximum of light for the driver of the automobile to which the headlight is attached will be produced.

A further object of the invention is the provision of a headlight which will send forth only parallel forward rays of light and downwardly diverging rays upon opposite sides of the parallel rays so that the roadway is lighted directly in front of the wheel and upon opposite sides of the wheels without disclosing any dark spots.

A further object of the invention is the provision of a reflector or headlight which will prevent glare and furnish a maximum of light for the driver of an automobile without necessitating the use of a lens at the forward open end of the headlight for concentrating or diffusing the light.

Other objects and advantages will become apparent during the course of the following description.

The invention is illustrated by way of example in the accompanying drawings, in which, Figure 1 is a front elevation of the reflector constructed according to my invention.

Figure 2 is a transverse longitudinal section of the same.

Figure 3 is a top plan view of the headlight showing the horizontal beam and the beams diverging in opposite directions.

Referring to the drawings, 1 designates the reflector constructed according to my invention and provided with a centrally disposed opening 2 through which projects a socket 3. A light bulb 4 is screwed into the socket 3 and in line with the horizontal axis of that portion of the reflector which is designated by 5 and located at the lower portion of the reflector.

As shown in Figure 1, the paraboloid reflector 5 subtends an arc greater than 180° as indicated by the dotted lines shown at 6 and is greater than a semi-paraboloid segment. The upper segment 7 likewise is formed in the shape of a paraboloid and subtends an arc of less than 180° and the radius of a transverse section of this reflector is less than the radius of the same transverse section of the reflector 5 so that the reflector 7 is offset from the parabolic surface of the reflector 5 as shown at 8. The outer lower ends of the reflector are offset to a greater extent, as shown at 9, than the upper edge designated at 10. The rear receding edge 11 of the reflector 7 gradually merges into the parabolic wall of the reflector 5.

It will be seen from this construction that the axis of the reflector 5 is in a horizontal plane passing centrally through the light bulb 4 while the axis of the reflector 7 is disclosed at an angle to the axis of the reflector 5.

The offset displacement of the surface of the paraboloid reflector 7 and to the extent indicated at 9 will cause light rays impinging against opposite sides of the axis of this reflector to diverge and fall upon opposite sides of the wheel and directly in front of the wheel while the rays emanating from the reflector 5 will be extended forwardly and in parallel relation to form horizontal rays of light straight ahead of the front wheels.

The outer edge 11 of the reflector 7 is rounded where the surface of the reflector and the flange 12 meet. If the reflector 7 were removed and the segment 5 of the lower reflector were continued to form a perfect parabolic mirror a single luminous beam of parallel rays would be formed and all points in advance of this beam would be illuminated which would not conform to the existing laws relative to automobile headlights. It will be seen from my construction that this cylindrical luminous beam has been reduced and only extends a few degrees within the axis of the lower reflector 5 so that the paraboloid reflector 7 which has a considerably reduced surface and located within the confines of the continuation of the paraboloid reflector 5 will take care of the light rays emanating from the light 4 and which are above the lines 6 and these light rays are deflected from the paraboloid reflector 7 at an angle at which they strike the surface of said reflector. The disposition of this reflector 7 relative to the light source 4 and the reflector 5 and which reflector is located within the confines of a complete paraboloid reflector of which the segment 5 forms a part, will cause the light rays to be reflected in a divergent manner and downwardly upon opposite sides of the semi-cylindrical horizontal beam from the reflector 5, thereby illuminating the ground upon opposite sides of the front wheels.

It is to be noted that no changes are required to be made in the usual construction of a headlight of an automobile, since it is only necessary to insert the reflector constructed according to my invention into the headlight or replace the usual reflector of a headlight by my construction.

The reflectors are stamped out of a thin sheet of metal, then highly polished and silvered after which they are secured in place in the headlight casings.

The reflector 7 is formed by a denting in of the metal from which the body 1 of the reflector is formed, as shown in Figure 2.

Holes 13 are punched in the flange 12 of the reflector whereby said reflector may be secured by means of bolts to the headlight casing.

What I claim is:

A reflector adapted to be provided with a source of light and comprising a parabolic shell having its upper portion indented thereby forming a pair of opposed semi-paraboloid upper and lower surfaces with their axes angularly arranged, the receding portions of the depressed upper section being formed on smaller arcs than the corresponding portions of the lower section and located entirely above the horizontal plane passing through the axis of the lower parabolic section, the upper parabolic section being located within the circumference of the lower parabolic section, the longitudinal adjacent edges of the sections being joined by a portion which gradually decreases in width from the front to the rear where it merges into the curved rear portions of both sections, the rear end of the upper parabolic section being formed on an arc of a circle and located appreciably above a horizontal plane passing through the axis of the lower parabolic section.

BENJAMIN FRANKLIN GIFT.